US010741028B2

(12) United States Patent
Yokoyama et al.

(10) Patent No.: US 10,741,028 B2
(45) Date of Patent: Aug. 11, 2020

(54) OUTPUT CONTROL DEVICE, OUTPUT CONTROLLING METHOD AND PROGRAM

(71) Applicant: SONY CORPORATION, Tokyo (JP)

(72) Inventors: Ryo Yokoyama, Tokyo (JP); Ikuo Yamano, Tokyo (JP); Osamu Ito, Tokyo (JP); Yosuke Matsuzaki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/323,575

(22) PCT Filed: Aug. 3, 2017

(86) PCT No.: PCT/JP2017/028176
§ 371 (c)(1),
(2) Date: Feb. 6, 2019

(87) PCT Pub. No.: WO2018/047543
PCT Pub. Date: Mar. 15, 2018

(65) Prior Publication Data
US 2019/0180577 A1 Jun. 13, 2019

(30) Foreign Application Priority Data
Sep. 8, 2016 (JP) ................. 2016-175220

(51) Int. Cl.
G08B 6/00 (2006.01)
A63F 13/285 (2014.01)
G06F 3/01 (2006.01)
A63F 13/54 (2014.01)

(52) U.S. Cl.
CPC .............. *G08B 6/00* (2013.01); *A63F 13/285* (2014.09); *A63F 13/54* (2014.09); *G06F 3/016* (2013.01)

(58) Field of Classification Search
None
See application file for complete search history.

(56) References Cited

U.S. PATENT DOCUMENTS

| | | | |
|---|---|---|---|
| 2003/0100367 A1* | 5/2003 | Cooke ..................... | A63F 13/28 463/36 |
| 2012/0150431 A1* | 6/2012 | Ooka .................. | G01C 21/3652 701/425 |
| 2014/0266644 A1* | 9/2014 | Heubel .................. | H04R 27/00 340/407.1 |
| 2016/0070348 A1* | 3/2016 | Cowley ................... | G06F 3/016 345/156 |

* cited by examiner

*Primary Examiner* — John F Mortell
(74) *Attorney, Agent, or Firm* — Paratus Law Group, PLLC

(57) ABSTRACT

There is provided an output control device to realize the control of the output position at the device more efficiently, the output control device including: a controller that, on the basis of a common signal to be employed by a plurality of devices, conducts an output control in regard to a plurality of output units provided in the device. The common signal includes information specifying an output unit serving as a control object. The controller generates a control signal derived by correcting the output unit serving as the control object on the basis of positional information of the device and the common signal which are acquired, and conducts the output control specific to the device on the basis of the control signal.

14 Claims, 16 Drawing Sheets

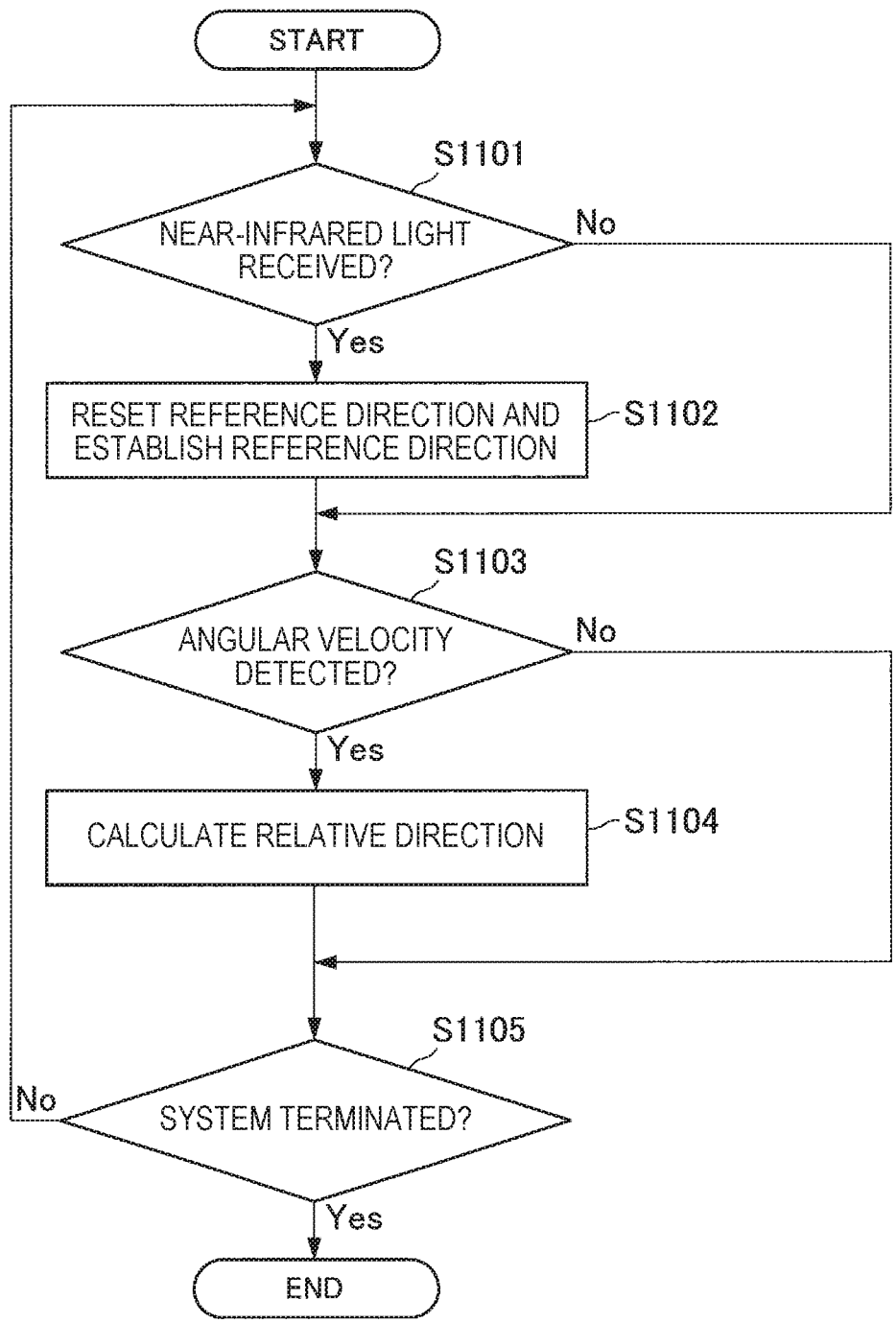

OUTPUT CONTROL DEVICE, OUTPUT CONTROLLING METHOD AND PROGRAM

CROSS REFERENCE TO PRIOR APPLICATION

This application is a National Stage Patent Application of PCT International Patent Application No. PCT/JP2017/028176 (filed on Aug. 3, 2017) under 35 U.S.C. § 371, which claims priority to Japanese Patent Application No. 2016-175220 (filed on Sep. 8, 2016), which are all hereby incorporated by reference in their entirety.

TECHNICAL FIELD

The present disclosure relates to an output control device, an output controlling method and a program.

BACKGROUND ART

In recent years, various kinds of technologies for representing a user an output having a more realistic sense have been devised. In addition, a technology for conducting an output control on the basis of an event occurring outside an output device has been also proposed.

For instance, Patent Literature 1 discloses an information processing apparatus that delays a tactile output to be outputted by an output device, corresponding to an occurrence position of an event in a virtual space.

CITATION LIST

Patent Literature

Patent Literature 1: JP 2015-166890A

DISCLOSURE OF INVENTION

Technical Problem

However, the information processing apparatus described in Patent Literature 1 does not conduct a control in regard to an output position though conducting an output timing control. Owing to the above, in the information processing apparatus described in Patent Literature 1, the same tactile stimuli are outputted from the same output section, independent of the occurrence position of the event.

Further, according to the information processing apparatus described in Patent Literature 1, in a case where a plurality of output devices resides, processing in regard to the output control become complicated and processing burdens therefor increase. Owing to the above, in some cases, it may be difficult to conduct the output controls in regard to the plurality of output devices at a time.

In view of the above, the present disclosure proposes an output control device, an output controlling method and a program, which are novel and improved so as to enable a device to realize the control of the output position more efficiently.

Solution to Problem

According to the present disclosure, there is provided an output control device including: a controller that, on the basis of a common signal to be employed by a plurality of devices, conducts an output control in regard to a plurality of output units provided in the device. The common signal includes information specifying an output unit serving as a control object. The controller generates a control signal derived by correcting the output unit serving as the control object on the basis of positional information of the device and the common signal which are acquired, and conducts the output control specific to the device on the basis of the control signal.

In addition, according to the present disclosure, there is provided an output controlling method including: conducting, on the basis of a common signal to be employed by a plurality of devices, an output control in regard to a plurality of output units provided in the device, by a processor. The common signal includes information specifying an output unit serving as a control object. The conducting the output control further includes generating a control signal derived by correcting the output unit serving as the control object on the basis of positional information of the device and the common signal which are acquired, and conducting the output control specific to the device on the basis of the control signal.

In addition, according to the present disclosure, there is provided a program for causing a computer to function as an output control device, the output control device including a controller that, on the basis of a common signal to be employed by a plurality of devices, conducts an output control in regard to a plurality of output units provided in the device. The common signal includes information specifying an output unit serving as a control object, and the controller generates a control signal derived by correcting the output unit serving as the control object on the basis of positional information of the device and the common signal which are acquired, and conducts the output control specific to the device concerned on the basis of the control signal.

Advantageous Effects of Invention

As described in the foregoing, according to the present disclosure, it becomes possible to realize the control of the output position at the device more efficiently.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 8 is a flowchart indicating a flow of a positional information detection by a jacket in accordance with the same embodiment.

MODE(S) FOR CARRYING OUT THE INVENTION

Figure 1:
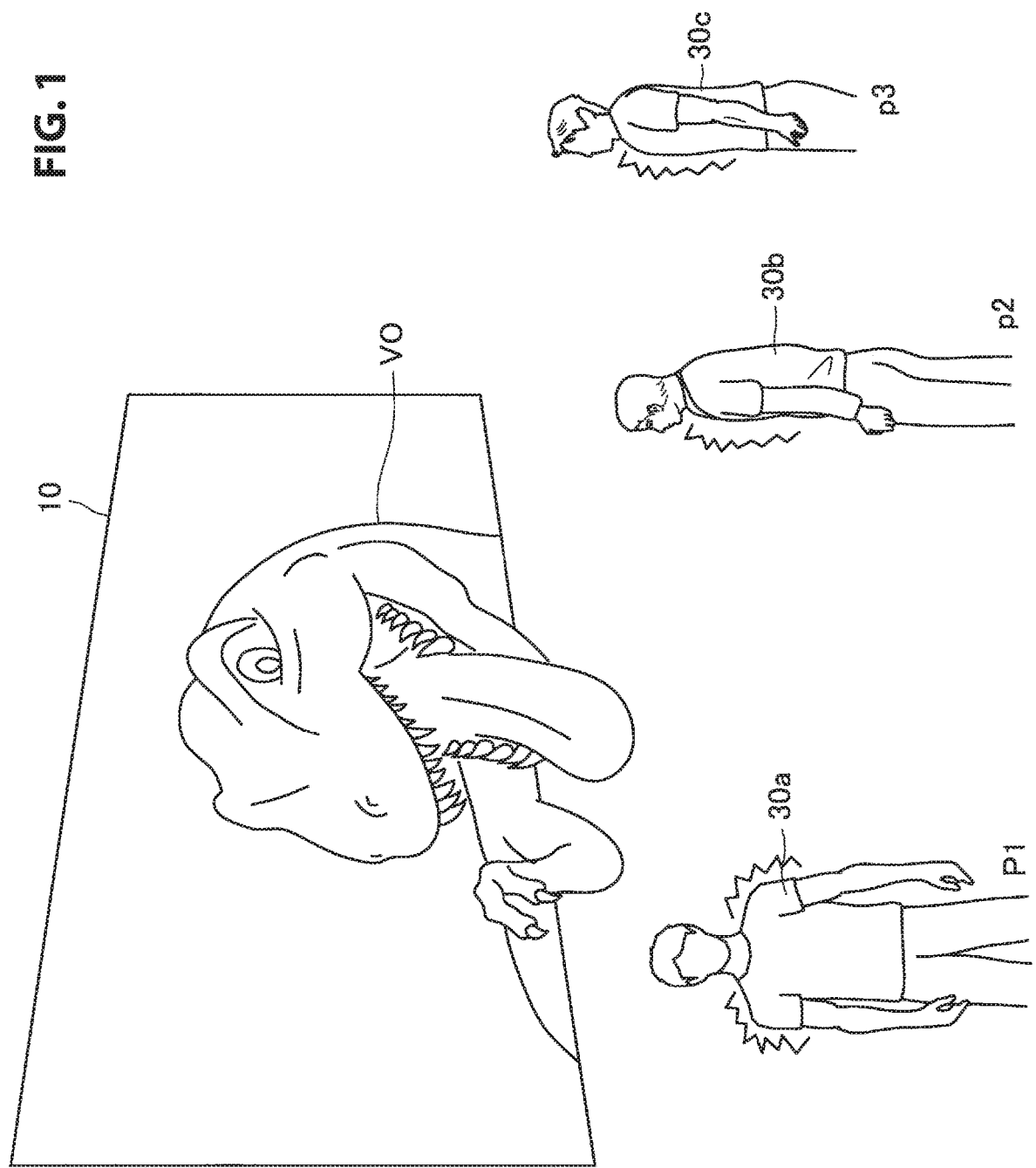
FIG. 1 is a conceptual schematic diagram for explaining a brief outline of an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Incidentally, the explanations will be given in the order indicated as follows.
1. Embodiment
   1.1. Brief Description of Embodiment
   1.2. Exemplary System Configuration
   1.3. Functional Configuration of Jacket 30
   1.4. Shape of Jacket 30
   1.5. Functional Configuration of Information Processing Server 40
   1.6. Positional Information Detection by Jacket 30
   1.7. Output Control by Jacket 30
   1.8. Flow of Operations of Jacket 30
   1.9. Modification Examples
2. Exemplary Hardware Configuration
3. Conclusion

1. EMBODIMENT

1.1. Brief Description of Embodiment

In recent years, there has been developed such a technology for conducting the output control corresponding to an event occurred outside and/or a position of the user. The above-mentioned technology may be possibly employed in such a case where a tactile stimulus and/or acoustic information which are linked to video images showed in, for instance, an attraction or the like to be performed in a theme park, are represented to the user.

Further, on that occasion, it can be also considered to control positions of the tactile stimulus and/or the acoustic information corresponding to the event occurring in the video images above-showed and a position of the user. This case enables the user to obtain an output linked with the video images and having a more realistic sense.

On the other hand, in a case of conducting the output control corresponding to positions and actions of users as mentioned above, the control device is requested to recognize the actions of all of the users. Further, the above-mentioned control device is also requested to transmit individual output control signals for every one of the users concerned, respectively. Owing to the above, in a case where the number of the users exceeds 100 persons or the like, processing burdens of the control device become large, and it is difficult to realize the system.

Further, for instance, in a case of detecting the user's actions by employing an infrared marker or the like, a plurality of image capturing devices becomes necessary, and as a result, a system installation cost tends to increase expensively.

The technical concept in accordance with the present disclosure has been inspired in view of the above-mentioned points, and enables the output position control to be realized more efficiently. For this end, an output control device, an output controlling method and a program, each in accordance with the present embodiment, correct a common signal to be employed by a plurality of devices on the basis of positional information acquired by an output device worn by a user, and thereby, have a function for individually conducting an output control for every one of the output devices concerned.

FIG. 1 is a schematic diagram illustrating a conceptual scheme for explaining a brief outline of an embodiment of the present disclosure. Illustrated in FIG. 1 are a display device 10, a virtual object VO that is displayed on the display device 10, jackets 30*a* through 30*c* in accordance with the present embodiment and users P1 through P3 respectively wearing the jackets 30*a* through 30*c*.

Herein, the jacket 30 in accordance with the present embodiment may be an output device that represents the user an output linked to an image and/or the virtual object VO displayed on the display device 10. On this occasion, the jacket 30 in accordance with the present embodiment conducts the above-mentioned control on the basis of the common signal to be received from an information processing server (not shown in the drawing). In this connection, the common signal in accordance with the present embodiment may include information specifying an output unit serving as a control object and/or other information designating an output strength to be exhibited by the output unit concerned.

Further, on the basis of the positional information detected, the jacket 30 in accordance with the present embodiment corrects the above-mentioned common signal and can generate the control signal specific to the jacket 30 concerned. More concretely speaking, the jacket 30 in accordance with the present embodiment detects directional information of the jacket 30, and corresponding to the directional information concerned, can correct the output unit serving as the control object and/or the output strength.

For instance, in FIG. 1, the user P1 wearing the jacket 30*a* is in a state that his back orients to the virtual object VO. On this occasion, the jacket 30*a* may correct the common signal on the basis of the directional information detected, and may make the output unit(s) located at his back face portion output a tactile stimulus (stimuli), etc. Further, the users P2 and P3 respectively wearing jackets 30*b* and 30*c* are in a state that their faces orient substantially in front of the virtual object VO. On this occasion, the jacket 30b and 30c may correct the common signal on the basis of the directional information detected, and may make the output unit(s) located at their front face portions output tactile stimuli, etc., respectively.

As mentioned above, the jacket 30 in accordance with the present embodiment corrects the common signal transmitted from the information processing server on the basis of the positional information to generate the control signal specific thereto for every jacket 30. Thereby, it becomes possible not only to alleviate the processing burden of the information processing server, but also to reduce the installation cost thereof.

1.2. Exemplary System Configuration

Figure 2:
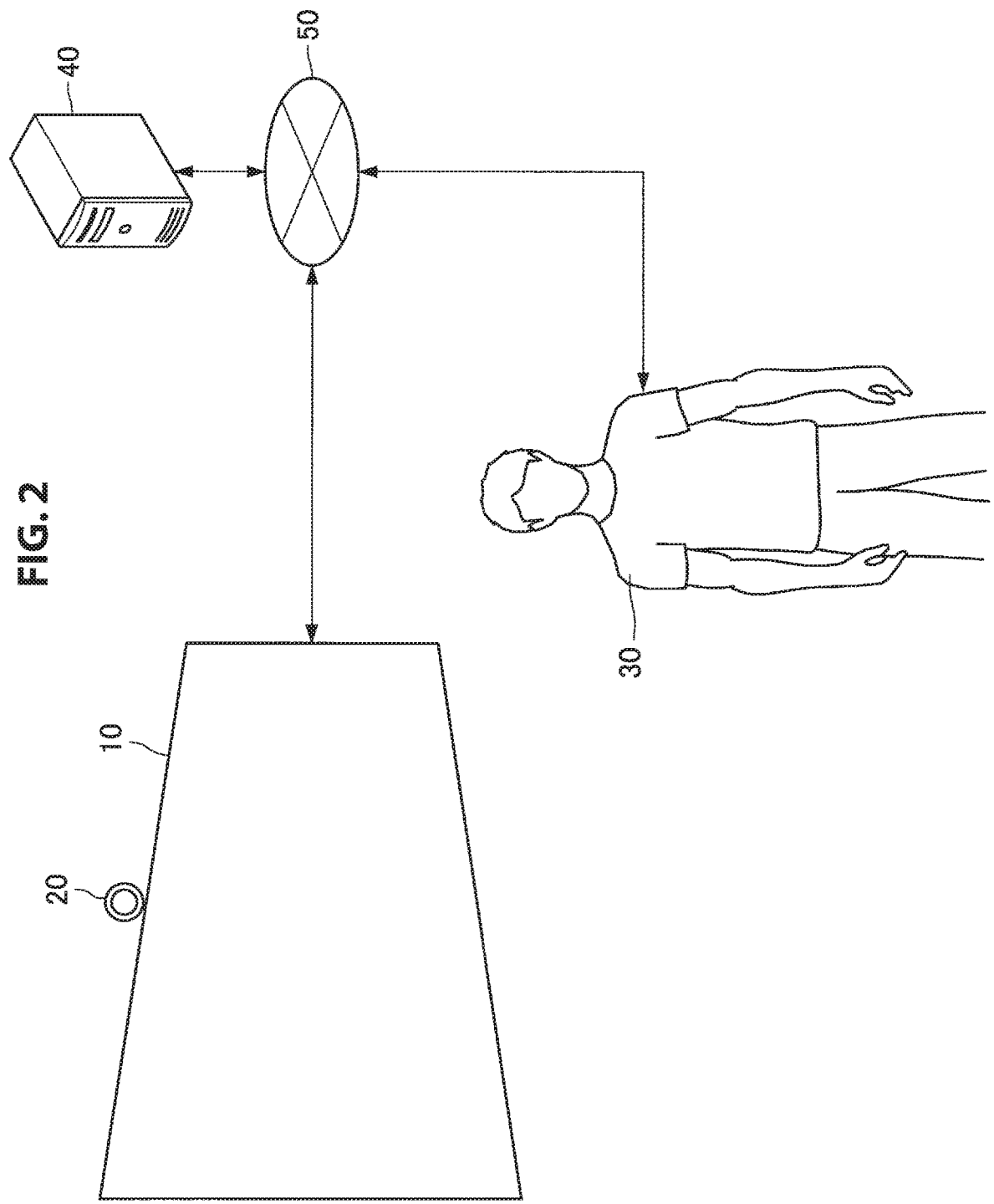
FIG. 2 is a schematic diagram illustrating an example of a system configuration scheme in accordance with the same embodiment.

Next, an exemplary system configuration in accordance with the present embodiment will be described. FIG. 2 is a schematic diagram illustrating an example of a system configuration scheme in accordance with the present embodiment. Referring to FIG. 2, an output control system in accordance with the present embodiment is provided with the display device 10, an illumination device 20, the jacket 30, and an information processing server 40. Further, the display device 10 and the jacket 30 are respectively coupled to the information processing server 40 through a network 50, so as to enable communications therebetween.

(Display Device 10)

The display device 10 in accordance with the present embodiment may be such a device that represents the user various kinds of images on the basis of controls by the information processing server 40. The display device 10 in accordance with the present embodiment can display, e.g., a three dimensional image (3D image) including the virtual object VO, etc. The display device 10 in accordance with the present embodiment may be realized by, e.g., a projector and screen, a liquid crystal display (LCD), an organic light-emitting diode (OLED) device, etc.

(Illumination Device 20)

The illumination device 20 in accordance with the present embodiment may be a device that has a function for radiating near-infrared light. The above-mentioned near-infrared light can be employed by the jacket 30 to calculate the directional information. Because of this, the illumination device 20 in accordance with the present embodiment is disposed at such a position, e.g., above the display device 10, that enable the near-infrared light to be radiated towards a plurality of users. Alternatively, the illumination device 20 in accordance with the present embodiment may be integrally formed with the display device 10.

(Jacket 30)

The jacket 30 in accordance with the present embodiment has a function for representing the user a tactile stimulus and/or acoustic information. As aforementioned, the jacket 30 in accordance with the present embodiment generates the control signal derived by correcting the common signal received from the information processing server 40 on the basis of the positional information detected, and thereby, has the function for conducting the output control specific to the jacket 30 on the basis of the control signal concerned. On this occasion, the jacket 30 may detect the directional information on the basis of the near-infrared light radiated from the illumination device 20. Functions provided in the jacket 30 in accordance with the present embodiment will be detailed later on.

(Information Processing Server 40)

The information processing server 40 in accordance with the present embodiment has a function for generating the common signal commonly employed by a plurality of jackets 30. In addition, the information processing server 40 in accordance with the present embodiment also has a function for controlling a display in regard to the display device 10. Functions provided in the information processing server 40 in accordance with the present embodiment will be detailed later on.

(Network 50)

The network 50 in accordance with the present embodiment has a function for connecting the display device 10 and the jacket 30 to the information processing server 40, respectively. The network 50 may include a public network, such as Internet, a public telephone network, a satellite communication network, etc., any one of various kinds of local area networks (LAN) including Ethernet, a wide area network (WAN), etc. In addition, the network 50 may include an exclusive-line communication network, such as an internet protocol-virtual private network (IP-VPN), etc.

1.3. Functional Configuration of Jacket 30

Figure 3:
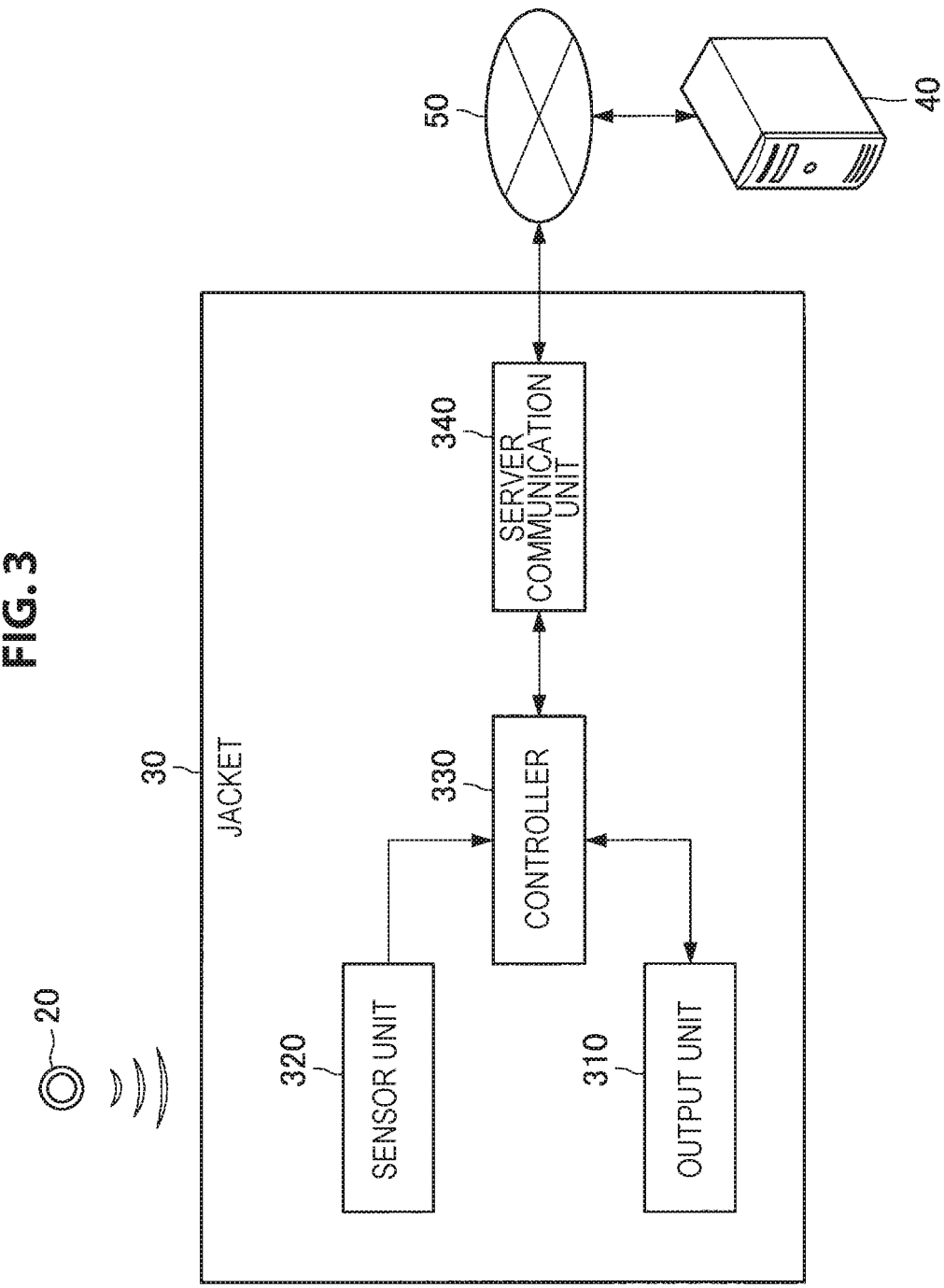
FIG. 3 is a functional block diagram of a jacket in accordance with the same embodiment.

Next, functional configurations of the jacket 30 in accordance with the present embodiment will be explained. FIG. 3 is a functional block diagram of the jacket 30 in accordance with the present embodiment. Referring to FIG. 3, the jacket 30 in accordance with the present embodiment is provided with an output unit 310, a sensor unit 320, a controller 330 and a server communication unit 340. In the following, with respect to each of the configurations indicated above, an explanation will be given while putting a feature owned by the configuration concerned at center.

(Output Unit 310)

The output unit 310 has a function for representing the user various kinds of outputs on the basis of the control conducted by the controller 330. More concretely speaking, the output unit 310 in accordance with the present embodiment may represent, e.g., a tactile stimulus and/or acoustic information or the like on the basis of the control conducted by the controller 330. Because of this, the output unit 310 in accordance with the present embodiment may be realized by, e.g., a vibration generating device, such as an eccentric motor, a linear vibrator, a piezo electric element, etc., and/or a speaker or the like. Further, other than the vibration, the above-mentioned tactile stimulus may include a thermal stimulus and/or an electrical stimulus or the like.

(Sensor Unit 320)

The sensor unit 320 has a function for detecting the positional information of the jacket 30. As aforementioned, the positional information in accordance with the present embodiment may include the directional information of the jacket 30. The sensor unit 320 in accordance with the present embodiment can detect the positional information on the basis of, e.g., the near-infrared light radiated from the illumination device 20. Because of this, the sensor unit 320 in accordance with the present embodiment may be realized by a near-infrared sensor and a gyrosensor or the like, having a directivity.

On the other hand, the sensor unit 320 in accordance with the present embodiment may detect the positional information without using the near-infrared light radiated from the illumination device 20. In this case, the sensor unit 320 in accordance with the present embodiment can be realized by a geomagnetic sensor and/or an image capturing device, a microphone having a directivity, or the like. The positional detection in accordance with the present embodiment will be detailed otherwise.

(Controller 330)

The controller 330 conducts the output control in regard to a plurality of output units 310 provided in the jacket 30 on the basis of the common signal to be employed by the plurality of jackets 30. More concretely speaking, the controller 330 in accordance with the present embodiment has a function for generating the control signals derived by correcting the output unit 310 serving as a control object, on the basis of the positional information acquired by the sensor unit 320 and the common signal aforementioned. In this connection, the positional information in accordance with the present embodiment includes the directional information. Namely, the controller 330 in accordance with the present embodiment can generate the control signal on the basis of the above-mentioned directional information and the common signal. Further, the controller 330 in accordance with the present embodiment has a function for conducting the output control specific to the jacket 30 on the basis of the control signal generated thereby.

According to the above-mentioned functions provided in the controller 330 in accordance with the present embodiment, it becomes possible for an individual one of the jackets 30 to implement the correction of the output control based on the direction of the jacket 30 concerned, and thereby, the processing burden of the information processing server 40 is enabled to decrease significantly.

Incidentally, the directional information in accordance with the present embodiment may include a relative direction relative to an object. Herein, the above-mentioned object designates the illumination device 20 or the like, which is disposed so as to correspond to the display device 10 and/or the virtual object VO to be displayed on the display device 10. In other words, the controller 330 in accordance with the present embodiment may generate the control signal on the basis of the relative direction of the jacket 30 relative to the illumination device 20 and the common signal.

On this occasion, the controller 330 in accordance with the present embodiment may calculate the above-mentioned relative direction on the basis of a reference direction acquired from the illumination device 20. More concretely speaking, the controller 330 in accordance with the present embodiment establishes the reference direction on the basis of the fact that the sensor unit 320 has received the near-infrared light, and can calculate the above-mentioned relative direction on the basis of the reference direction concerned and angular velocity information acquired by the sensor unit 320.

Further, the controller 330 in accordance with the present embodiment may generate the control signal derived by correcting the output strength on the basis of the positional information detected and the common signal. According to the concerned function provided in the controller 330 in accordance with the present embodiment, it becomes possible to represent the user an output having a more realistic sense, corresponding to a position of the jacket 30. Incidentally, the details in regard to the generation of the control signal in accordance with the present embodiment, will be detailed otherwise.

(Server Communication Unit 340)

The server communication unit 340 has a function for receiving the common signal from the information processing server 40. Further, the server communication unit 340 in accordance with the present embodiment may transmit the positional information or the like acquired by the sensor unit 320 to the information processing server 40.

1.4. Shape of Jacket 30

Figure 4:
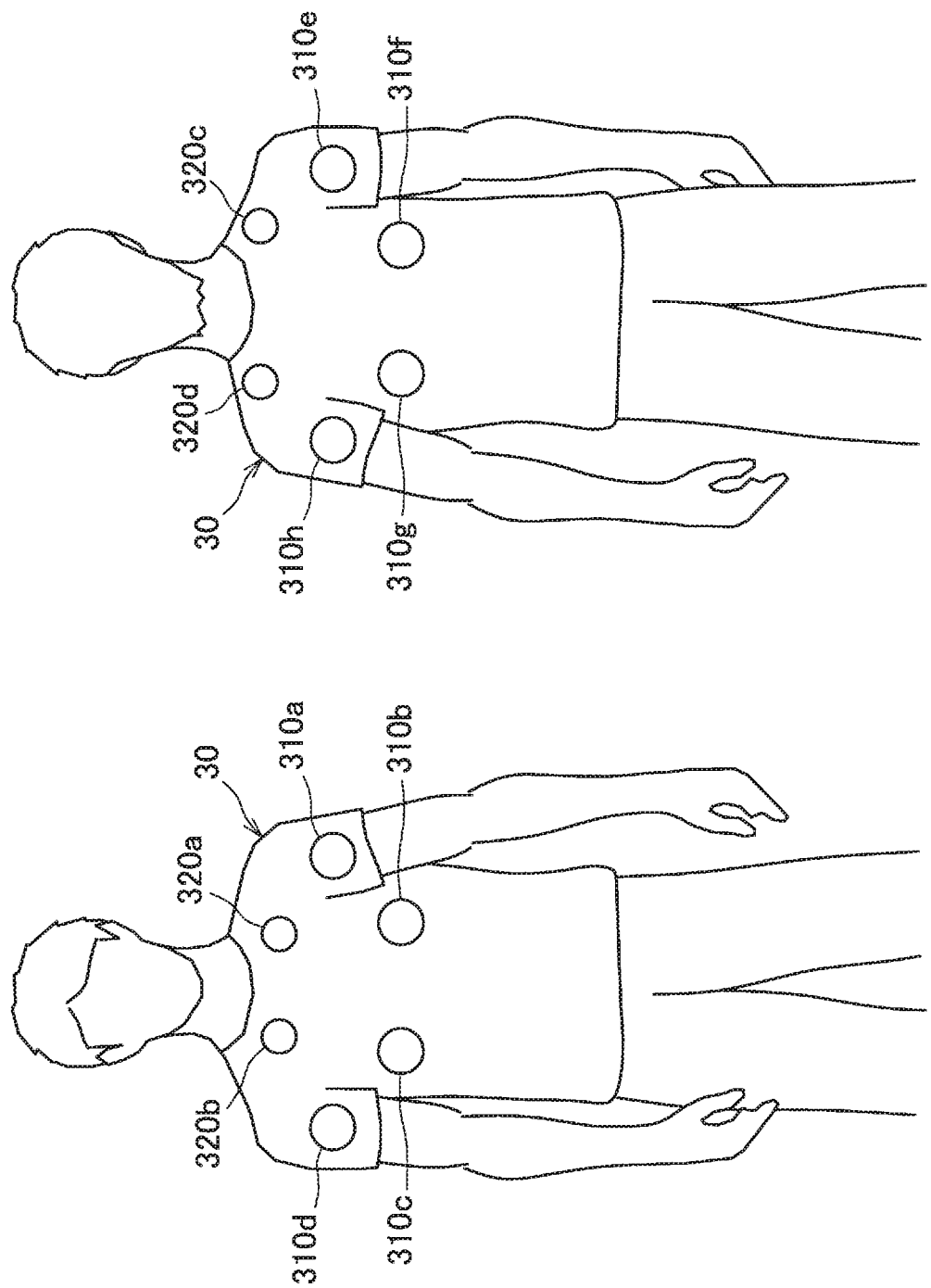
FIG. 4 is a schematic diagram illustrating a shape of a jacket in accordance with the same embodiment.

Next, a shape of the jacket 30 in accordance with the present embodiment will be described. FIG. 4 is a schematic diagram illustrating a shape of the jacket 30 in accordance with the present embodiment. Herein, at a left area of FIG. 4, a shape of a front face portion of the jacket 30 is depicted, while at a right area of FIG. 4, a shape of a back face portion of the jacket 30 is depicted.

As shown in FIG. 4, the jacket 30 in accordance with the present embodiment may be provided with a plurality of output units 310a through 310h and a plurality of sensor units 320a through 320d. Further, the plurality of output units 310a through 310h and the plurality of sensor units 320a through 320d, both in accordance with the present embodiment, may be disposed at predetermined intervals around periphery of the jacket 30 in a manner of being correspondable to each direction centering on the jacket 30. An exemplary illustration in FIG. 4 indicates such a case that four output units 310a through 310d and two sensor units 320a and 320b are disposed in the front face portion of the jacket 30, while four output units 310e through 310h and two sensor units 320c and 320d are disposed in the back face portion thereof.

In this connection, the number of the plurality of output units 310 and the number of the plurality of the sensor units 320, both in accordance with the present embodiment, are not limited to those indicated in an example illustrated in FIG. 4. The number of the output units 310 provided in the jacket 30 in accordance with the present embodiment may be either equal to or more than 9, or equal to or less than 7. As well as the above, the number of the sensor units 320 in accordance with the present embodiment may be either equal to or more than 5, or equal to or less than 3. The number of the output units 310 and the number of the sensor units 320, both in accordance with the present embodiment, may be flexibly changeable depending on specifications and operations of a system to be applied.

Further, an arrangement of the plurality of output units 310 and the plurality of the sensor units 320, both in accordance with the present embodiment, are not limited to those indicated in an example illustrated in FIG. 4. The output units 310 and the sensor units 320, both in accordance with the present embodiment, are not necessary disposed equally in the front face portion and the back face portion of the jacket 30, but, for instance, more units may be disposed in the front face portion. According to such an arrangement as mentioned above, in a case where this arrangement is applied to a system in which the users fundamentally orient to the display device 10 or the like, it becomes possible to conduct a more delicate control of the output positions.

Still further, the output units 310 and the sensor units 320, both in accordance with the present embodiment, may be disposed in such a manner that plural units are aligned in parallel rows along the vertical direction of the jacket 30. According to the arrangement as mentioned above, it becomes possible to control the outputs of tactile stimuli and acoustic information along the vertical direction in addition to the horizontal direction, and as a result, it becomes possible to represent the user the outputs having a more realistic sense.

1.5. Functional Configuration of Information Processing Server 40

Figure 5:
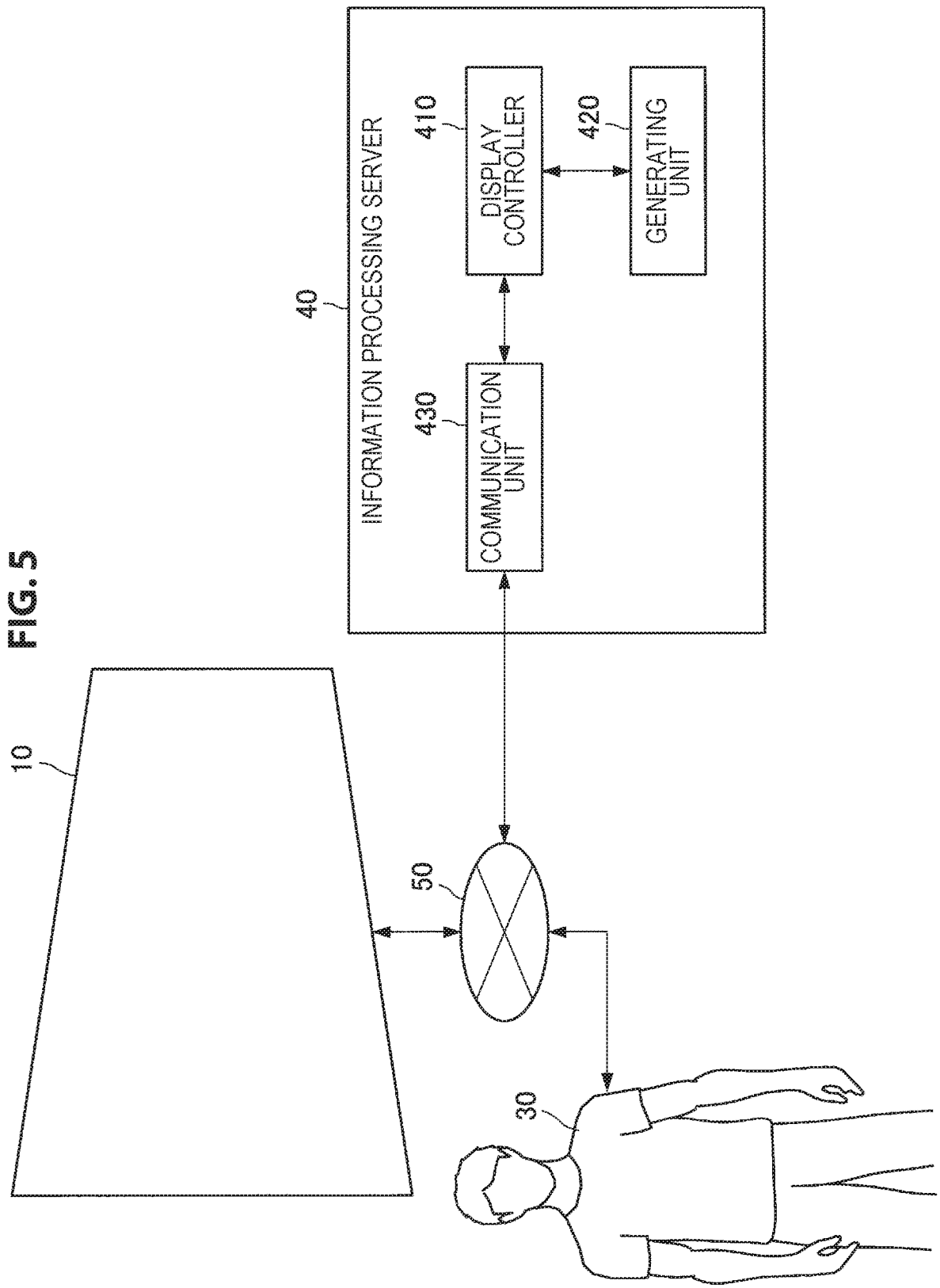
FIG. 5 is a schematic diagram illustrating a functional block diagram of an information processing server in accordance with the same embodiment.

Next, the functional configuration of the information processing server 40 in accordance with the present embodiment will be described. FIG. 5 is a schematic diagram illustrating a functional block diagram of the information processing server 40 in accordance with the present embodiment. Referring to FIG. 4, the information processing server 40 in accordance with the present embodiment is provided with a display controller 410, a generating unit 420 and a communication unit 430. In the following, with respect to each of the configurations indicated above, an explanation will be given in detail while centering on a feature owned by the configuration concerned.

(Display Controller 410)

The display controller 410 has a function for controlling a display by the display device 10. The display controller 410 in accordance with the present embodiment controls, for instance, information for a video image or the like to be displayed onto the display device 10, and hands over the information concerned to the generating unit 420.

(Generating Unit 420)

The generating unit 420 has a function for generating a common signal to be employed by the plurality of jackets 30. As aforementioned, the common signal in accordance with the present embodiment includes the information for specifying the output unit 310 and the information for designating the output strength. On this occasion, on the basis of the information in regard to the display control, acquired from the display controller 410, the generating unit 420 in accordance with the present embodiment can generate the common signal linked to the video image and/or the virtual object residing within the image.

(Communication Unit 430)

The communication unit 430 has a function for transmitting the common signal generated by the generating unit 420 to the plurality of jackets 30. In addition, the communication unit 430 has a function for transmitting the signal in regard to the display control by the display controller 410 to the display device 10.

1.6. Positional Information Detection by Jacket 30

Next, the positional information detection by jacket 30 in accordance with the present embodiment will be described in detail. As aforementioned, the positional information in accordance with the present embodiment includes the directional information. Further, on the basis of the near-infrared light received by the sensor unit 320, the jacket 30 in accordance with the present embodiment establishes the reference direction, and then, on the basis of the reference direction concerned and the angular velocity information detected by the sensor unit 320, the jacket 30 can calculate the relative direction relative to the object.

Figure 6A:
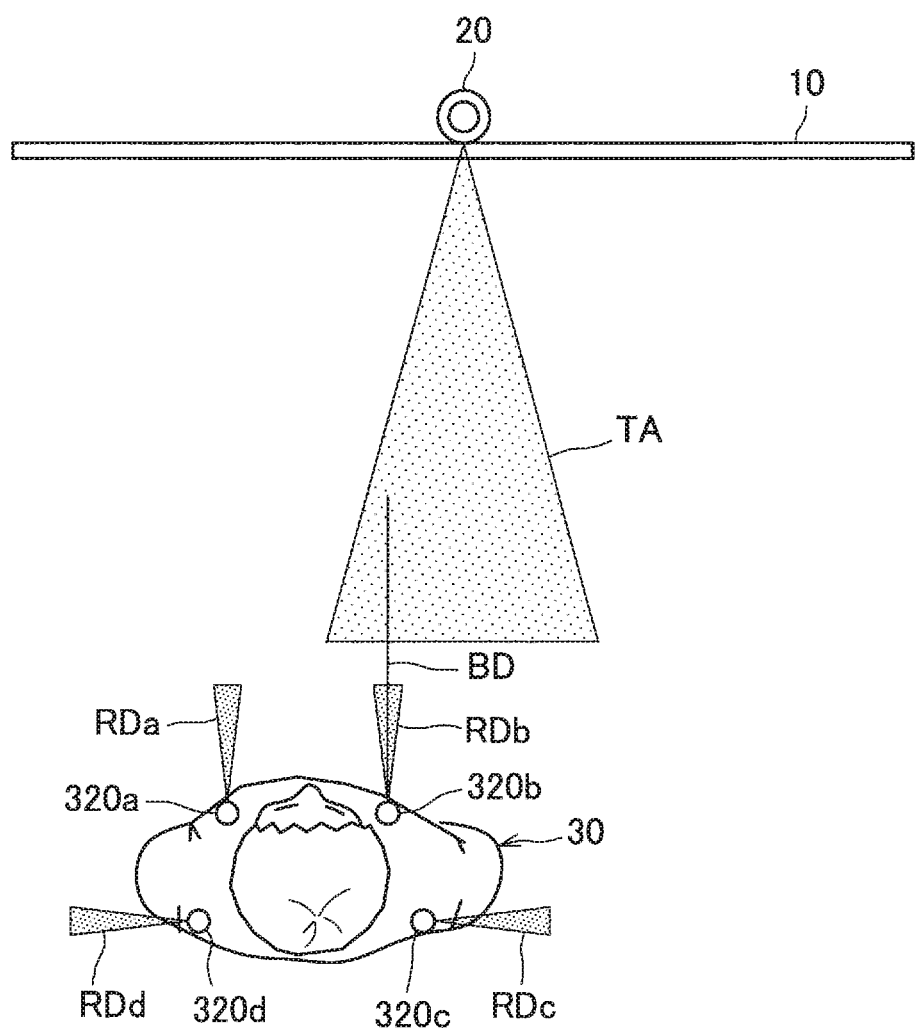
FIG. 6A is a schematic diagram for explaining an establishment of a reference direction and a calculation of a relative direction by a jacket in accordance with the same embodiment.
Figure 6B:
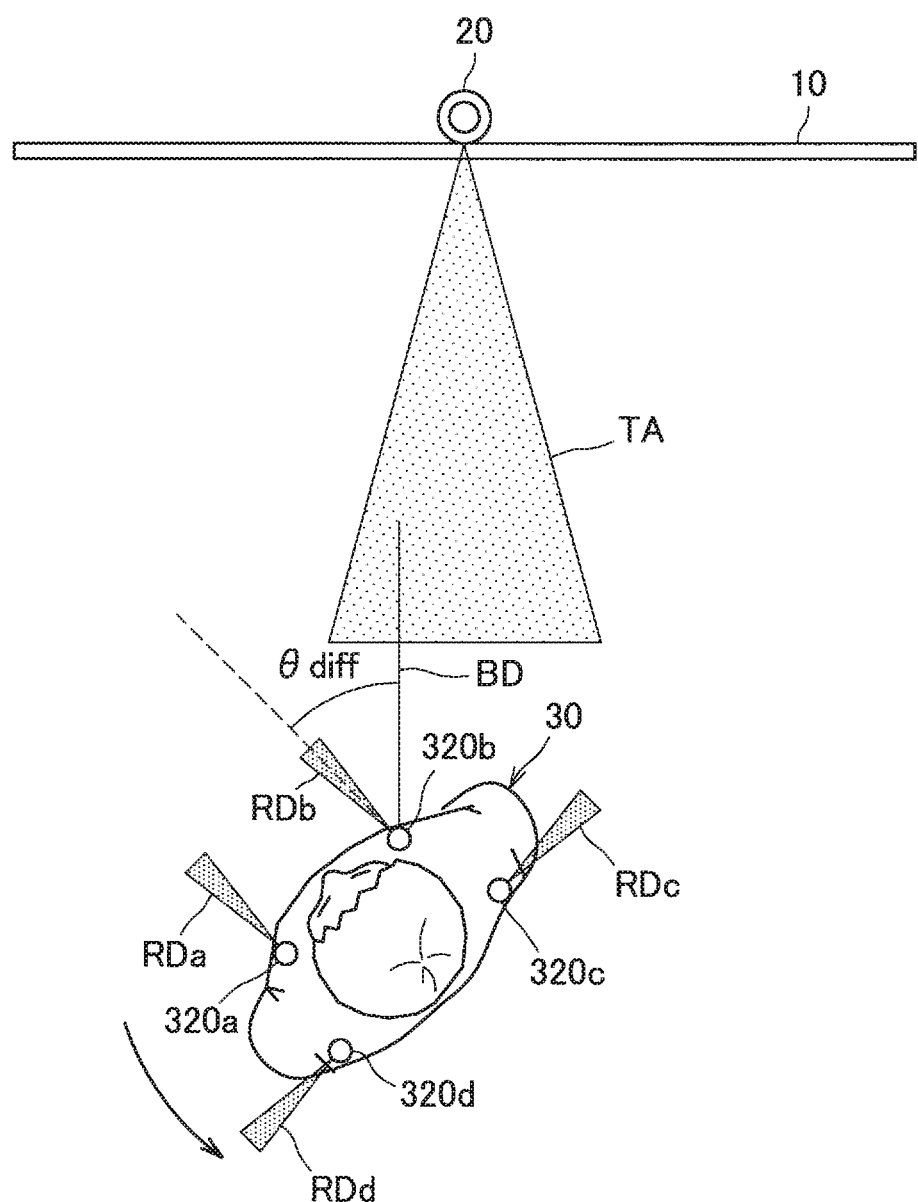
FIG. 6B is a schematic diagram for explaining an establishment of a reference direction and a calculation of a relative direction by a jacket in accordance with the same embodiment.
Figure 6C:
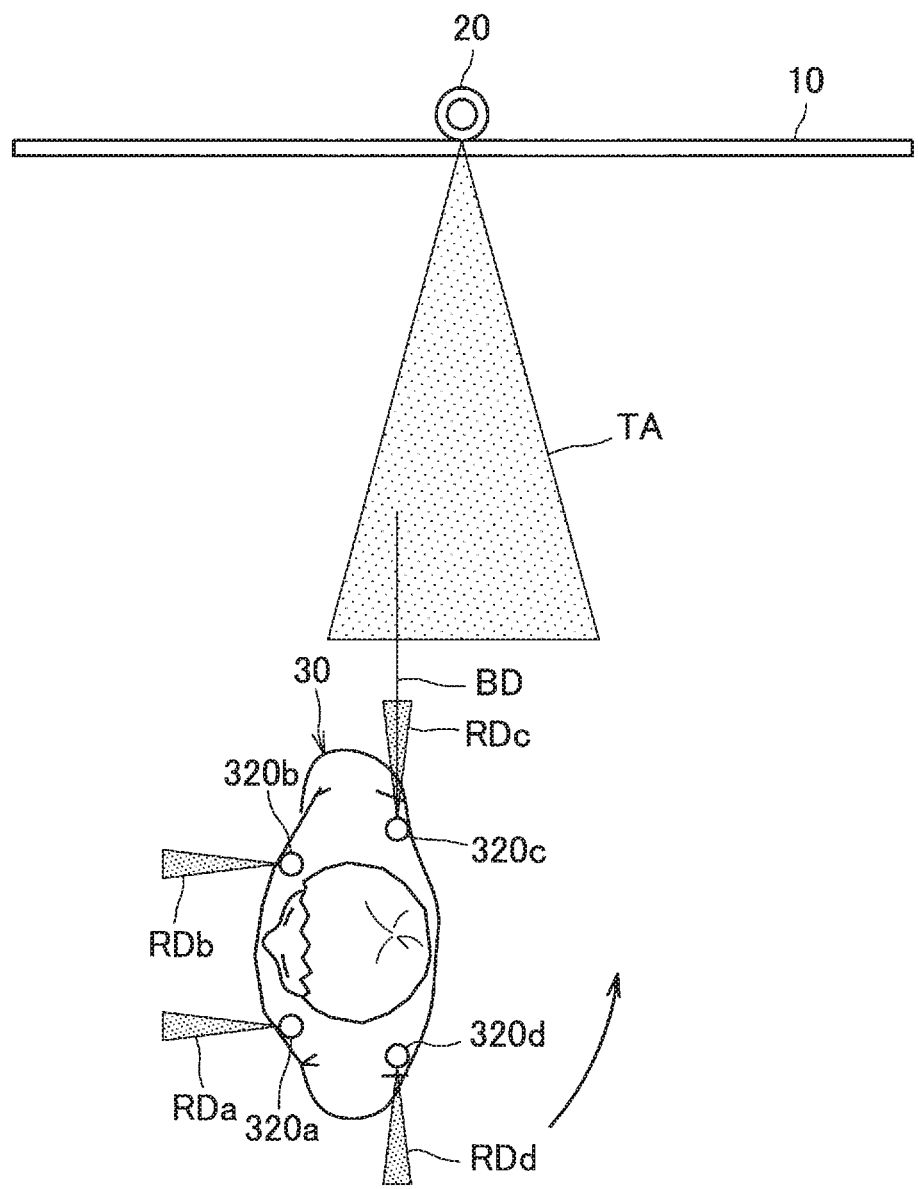
FIG. 6C is a schematic diagram for explaining an establishment of a reference direction and a calculation of a relative direction by a jacket in accordance with the same embodiment.

FIGS. 6A through 6C are explanatory schematic diagrams for explaining an establishment of the reference direction and a calculation of the relative direction of the jacket 30 in accordance with the present embodiment. In this connection, FIGS. 6A through 6C respectively illustrate positional relationships between the display device 10, the illumination device 20 and the jacket 30 in a manner overviewing from the upper direction.

Initially, referring to FIG. 6A, the establishment of the reference direction will be described. In FIG. 6A, an irradiation range TA of the near-infrared light radiated from the illumination device 20 and light receivable ranges RDa through RDd respectively corresponding to the plurality of sensor units 320a through 320d provided in the jacket 30 are illustrated. In this connection, the irradiation range TA and the light receivable ranges RDa through RDd, depicted in FIGS. 6A through 6C, are merely schematic illustrations for explaining the detection of the positional information in accordance with the present embodiment, and therefore, practical ranges thereof are not limited to those indicated in this example.

At first, the sensor unit 320 of the jacket 30 receives near-infrared light emitted from the illumination device 20. In an example illustrated in FIG. 6A, the sensor unit 320b provided in the front side portion of the jacket 30 receives the near-infrared light from the illumination device 20. On this occasion, the controller 330 in accordance with the present embodiment can establish the reference direction on the basis of the near-infrared light received by the sensor unit 320b. In this connection, the sensor units 320a through 320d may include near-infrared light sensors having a directivity, respectively.

Next, referring to FIG. 6B, a calculation of the relative direction in accordance with the present embodiment will be described. FIG. 6B illustrates such a case that the user wearing the jacket 30 performs a rotating action in an anti-clockwise direction from the state indicated in FIG. 6A. On this occasion, the sensor unit 320 in accordance with the present embodiment acquires angular velocity information corresponding to the above-mentioned rotating action.

Thereby, the controller 330 in accordance with the present embodiment can calculate a difference relative to a reference direction BD. Namely, the controller 330 in accordance with the present embodiment can calculate the relative direction of the jacket 30 relative to the illumination device 20 from the angular velocity information and the reference direction.

FIG. 6C is a schematic diagram for explaining a reset and a reestablish of the reference direction in accordance with the present embodiment. FIG. 6C illustrates such a case that the user wearing the jacket 30 further performs the rotating action in the anti-clockwise direction from the state indicated in FIG. 6B. Further, in an example illustrated in FIG. 6C, the sensor unit 320c receives the near-infrared light from the illumination device 20.

On this occasion, the controller 330 in accordance with the present embodiment resets the absolute direction at present, to newly establish a reference direction. Namely, the controller 330 in accordance with the present embodiment can reset errors accumulated in the angular velocity information. According to the above-mentioned function provided in the controller 330, it becomes possible to easily reset the bias deviation amount, namely the drift, of the gyrosensor provided in the sensor unit 320. As a result, it becomes possible to acquire directional information having an accuracy higher than ever.

Further, as aforementioned, the jacket 30 in accordance with the present embodiment can detect the relative direction by employing the near-infrared light sensor and the gyrosensor, prices of which are relatively cheap. Thereby, an installation cost of the system can be reduced significantly, while enabling the system to apply for a large number of users.

1.7. Output Control by Jacket 30

Next, the output control by the jacket 30 in accordance with the present embodiment will be described in detail. The jacket 30 in accordance with the present embodiment can conduct an output control specific to the jacket 30, on the basis of the relative direction calculated, and the common signal received from the information processing server 40. More concretely speaking, the jacket 30 in accordance with the present embodiment generates a control signal derived by correcting the common signal on the basis of the relative information, and then, can perform the output control on the basis of the information concerned.

Figure 7A:
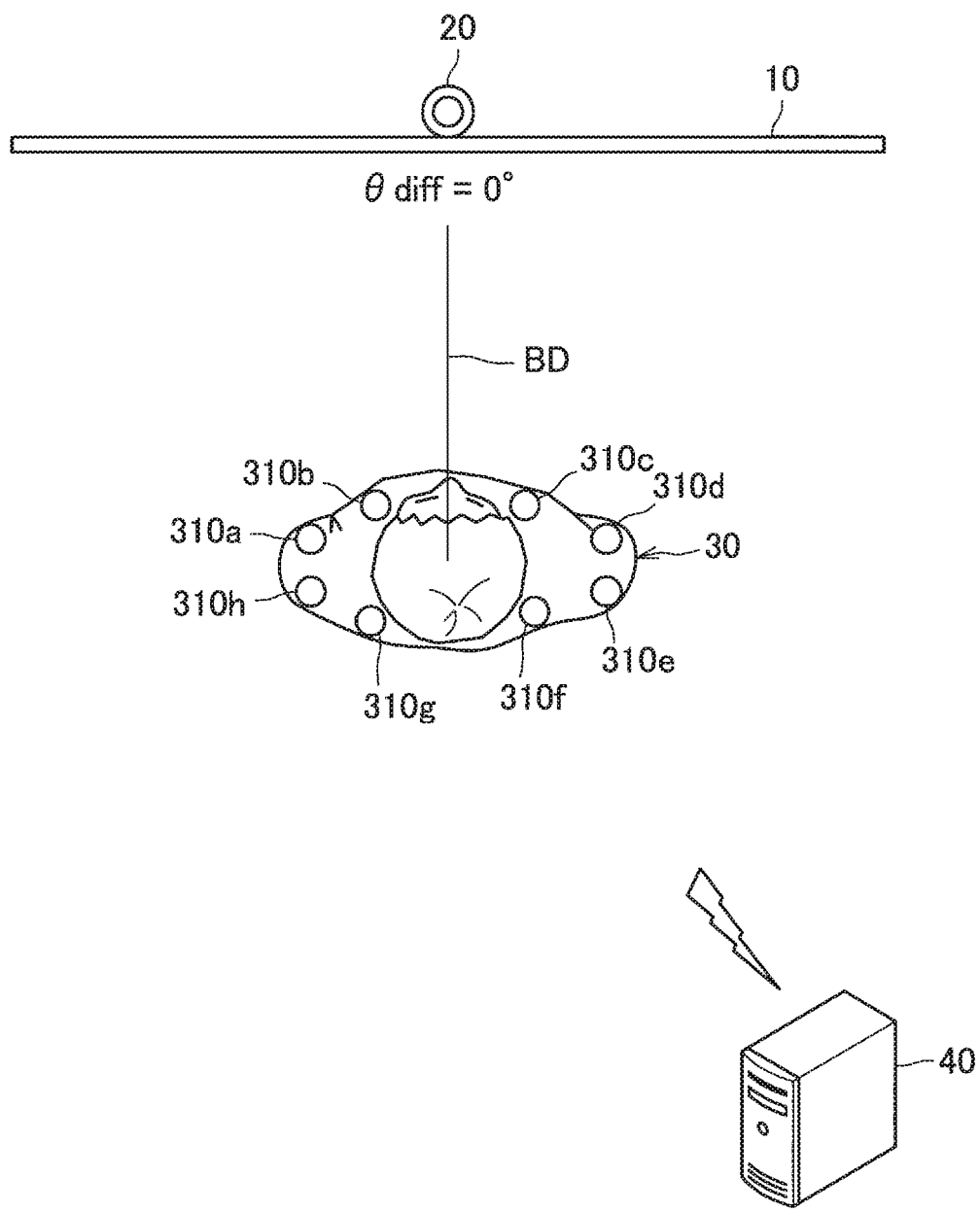
FIG. 7A is a schematic diagram for explaining an output control by a jacket in accordance with the same embodiment.
Figure 7B:
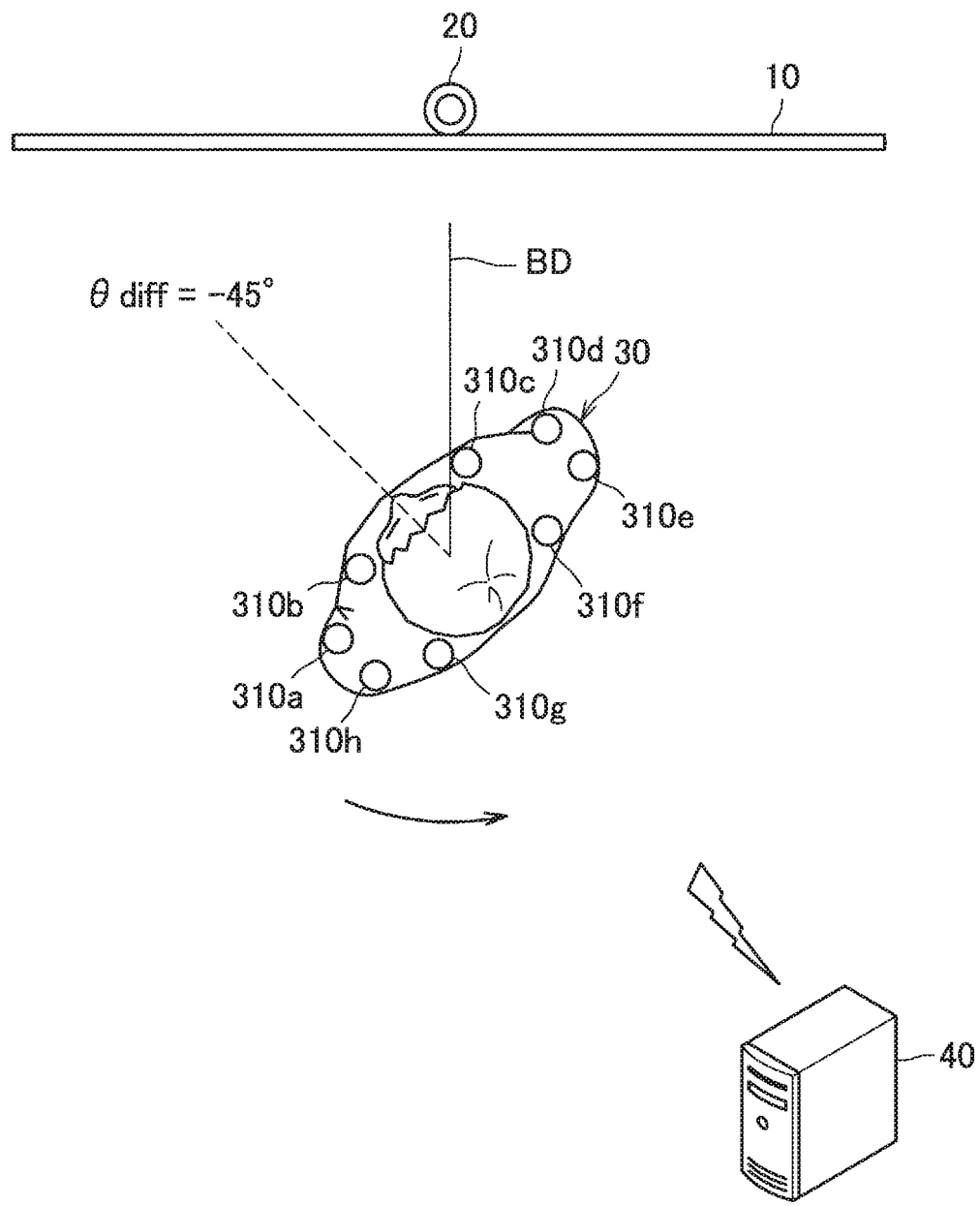
FIG. 7B is a schematic diagram for explaining an output control by a jacket in accordance with the same embodiment.
Figure 7C:
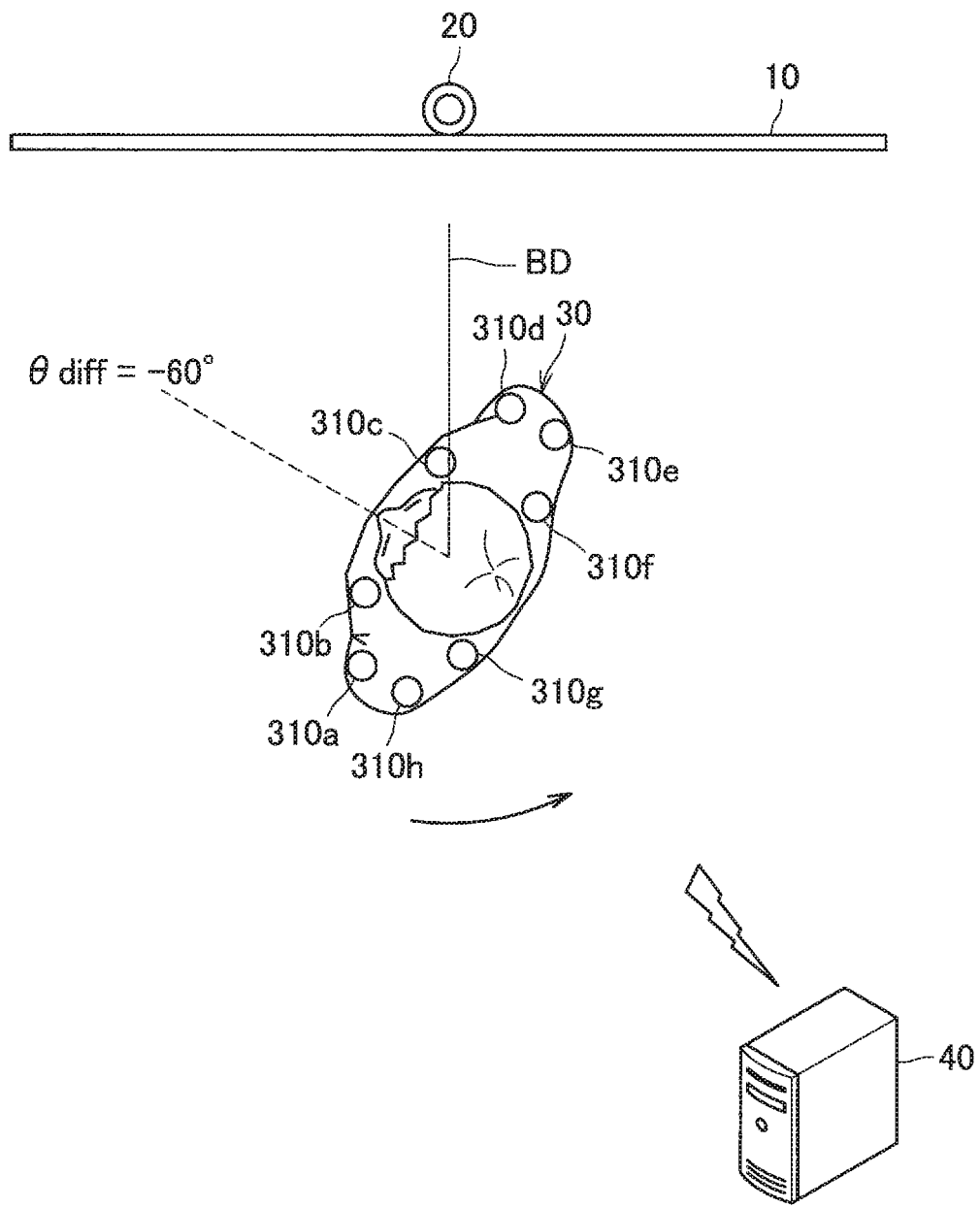
FIG. 7C is a schematic diagram for explaining an output control by a jacket in accordance with the same embodiment.

FIGS. 7A through 7C are explanatory schematic diagrams for explaining an output control in accordance with the present embodiment. In this connection, FIGS. 7A through 7C respectively illustrate positional relationships between the display device 10, the illumination device 20 and the jacket 30 in a manner overviewing from the upper direction.

Further, in FIGS. 7A through 7C, the jacket 30 receives the common signal transmitted from the information processing server 40. Herein, the above-mentioned common signal may be such a signal that designates a control object and an output strength indicated in Table 1 below.

TABLE 1

| Number | Control Object | output strength |
|---|---|---|
| 1 | 310b | 1.0 |
| 2 | 310c | 1.0 |

Referring to FIG. 7A, the output control in accordance with the present embodiment is continued to explain. FIG. 7A is a schematic diagram for explaining an output control in a case where the jacket 30 orients to the same direction as the reference direction BD. Because of this, in FIG. 7A, "$\theta_{\mathit{diff}}$", representing an angular difference relative to the reference direction BD, is set at 0°. Herein, "$\theta_{\mathit{diff}}$" mentioned above corresponds to the relative direction.

On this occasion, the controller 330 in accordance with the present embodiment generates a control signal derived by correcting the common signal indicated in Table 1 above on the basis of the reference direction. The controller 330 determines which sensor unit 320 has received the near-infrared light serving as the basis of setting the current reference direction, and thereby, can generate the control signal. On this occasion, the controller 330 may conduct the above-mentioned correction, for instance, by referring to the angular differences between the initial direction established in advance and the reference directions respectively corresponding to the sensor units 320. In an example illustrated in FIG. 7A, due to the fact that the angular difference between the initial direction and the reference direction is equal to 0°, the controller 330 outputs the tactile stimulus and the acoustic information at the output strength of 1.0 to the output units 310c and 310d, respectively.

Successively, refer to FIG. 7B. FIG. 7B is a schematic diagram illustrating the output control in a case where "$\theta_{\mathit{diff}}$" corresponding to the relative direction is equal to −45°. On this occasion, the controller 330 in accordance with the present embodiment generates a control signal derived by correcting the common signal indicated in Table 1 above-cited in the relative direction to conduct the output control based on the control signal concerned. In an example illustrated in FIG. 7B, the controller 330 generates a control signal derived by correcting the control objects to the output units 310c, 310b, and make the output units 310c, 310d output the tactile stimuli and the acoustic information at the output strength of 1.0, respectively.

Further, FIG. 7C is a schematic diagram illustrating an output control in a case where "$\theta_{\mathit{diff}}$" corresponding to the relative direction is equal to −60°. Referring to FIG. 7C, three output units 310c through 310e oppose to the illumination device 20. In this case, the controller 330 in accordance with the present embodiment may increase the number of the output units 310 serving as the control objects. In an example illustrated in FIG. 7C, the controller 330 corrects the common signal in which two output units 310b, 310c are set as the control objects, and thereby, can set the three output units 310b through 310e as the control objects.

Still further, on this occasion, the controller 330 in accordance with the present embodiment may change the output strength on the basis of the altered number of the control objects. In an example illustrated in FIG. 7C, the controller 330 can generate the control signals derived by correcting the output strengths of the output units 310c through 310e to, e.g., 0.6, 0.8 and 0.6, respectively. As described above, the controller 330 in accordance with the present embodiment disperses the output strength set in the common signal, corresponding to the increased number of control objects, and thereby, it becomes possible to represent tactile stimuli and/or acoustic outputs having a more realistic sense to the user.

1.8. Flow of Operations of Jacket 30

(Flow of Positional Information Detection)

Next, a flow of operations of the jacket 30 in accordance with the present embodiment will be described. Initially, a flow of the positional information detection in accordance with the present embodiment will be described. FIG. 8 is a flowchart indicating a flow of the positional information detection to be performed by the jacket 30 in accordance with the present embodiment.

Referring to FIG. 8, at first, the controller 330 of the jacket 30 in accordance with the present embodiment determines whether or not the near-infrared light transmitted from the illumination device 20 is received by the sensor unit 320 (Step S1101).

Herein, in a case where the controller 330 determines that the near-infrared light is received by the sensor unit 320 (Step S1101: Yes), the controller 330 resets the reference direction, and establishes a reference direction (Step S1102).

After establishing the reference direction in Step S1102, or, in a case where the controller 330 determines that the near-infrared light is not received by the sensor unit 320 (Step S1101: No), successively, the controller 330 determines whether or not the angular velocity information is detected by the sensor unit 320 (Step S1103).

Herein, in a case where the controller 330 determines that the angular velocity information is detected by the sensor unit 320 (Step S1103: Yes), successively, the controller 330 calculates the relative direction on the basis of the angular velocity information calculated and the reference direction (Step S1104).

After calculating the relative direction in Step S1104, or, in a case where the controller 330 determines that the angular velocity information is not detected by the sensor unit 320 (Step S1103: No), successively, the controller 330 performs determination of the termination of the system (Step S1105).

Herein, in a case where the controller 330 detects the termination of the system (Step S1105: Yes), the jacket 30 terminates the consecutive processing in regard to the detection of the positional information.

On the other hand, in a case where the controller 330 does not detect the termination of the system (Step S1105: No), the jacket 30 resumes the processing in the Step S1101 to repeatedly implement the following processing.

(Flow of Output Control)

Figure 9:
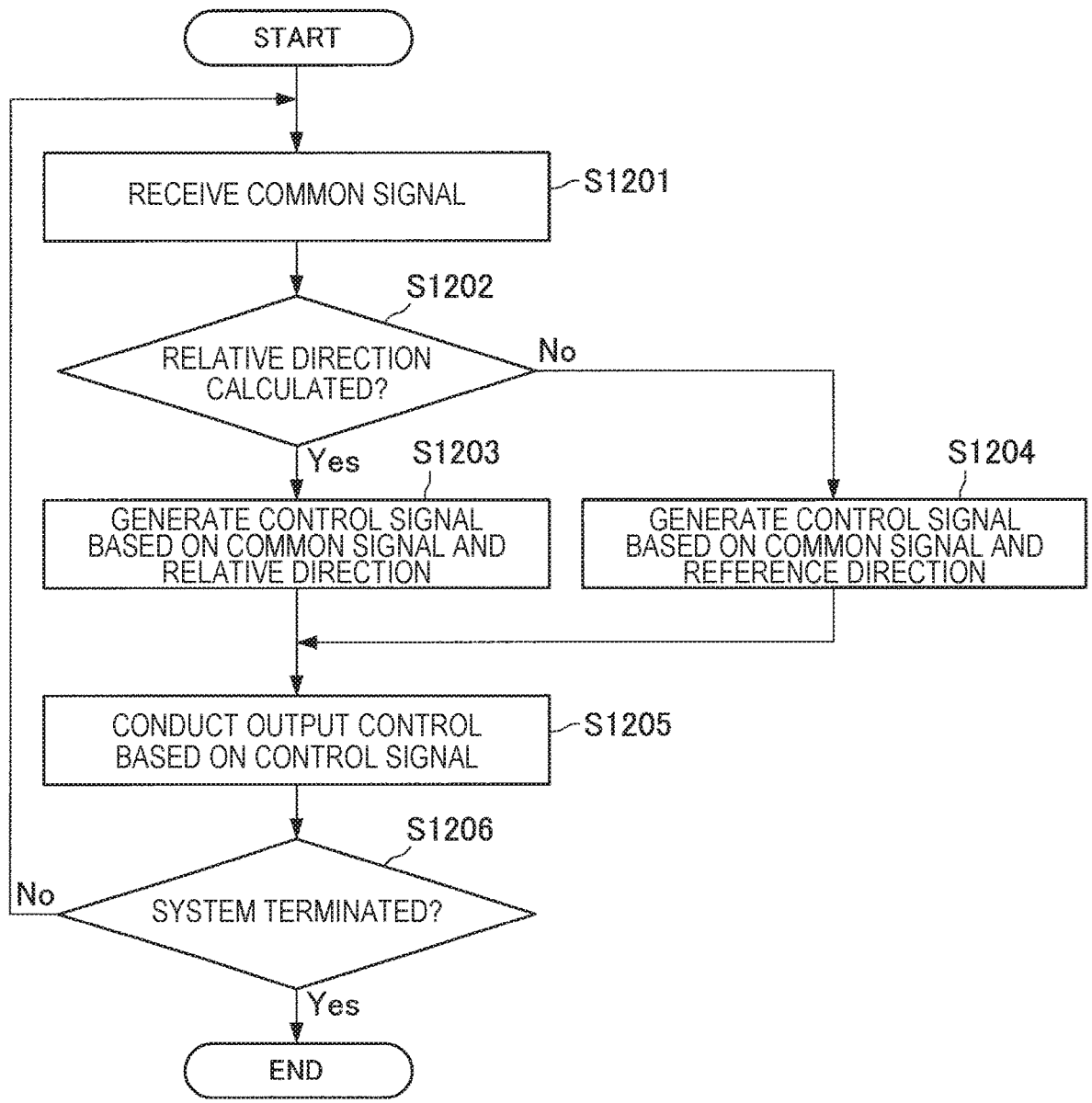
FIG. 9 is a flowchart indicating a flow of an output control by a jacket in accordance with the same embodiment.

Next, a flow of the output control in accordance with the present embodiment will be described. FIG. 9 is a flowchart indicating a flow of the output control to be conducted by the jacket 30 in accordance with the present embodiment.

Referring to FIG. 9, at first, the server communication unit 340 of the jacket 30 receives a common signal from the information processing server 40 (Step S1201).

Successively, the controller 330 determines whether or not the relative direction is calculated (Step S1202).

Herein, in a case where the controller 330 determines that the relative direction is calculated (Step S1202: Yes), successively, the controller 330 generates a control signal derived by correcting the common signal received in Step S1201 on the basis of the relative direction (Step S1203).

On the other hand, in a case where the controller 330 determines that the relative direction is not calculated (Step S1202: No), successively, the controller 330 generates a control signal derived by correcting the common signal received in Step S1201 on the basis of the reference direction (Step S1204).

After generating the control signal in Step S1203 or Step S1204, successively, the controller 330 implements the output control for the output unit 310 on the basis of the control signal generated thereby (Step S1205).

Successively, the controller 330 performs determination of the termination of the system (Step S1206). Herein, in a case where the controller 330 detects the termination of the system (Step S1206: Yes), the jacket 30 terminates the consecutive processing in regard to the output control.

On the other hand, in a case where the controller 330 does not detect the termination of the system (Step S1206: No), the jacket 30 resumes the processing in the Step S1201 to repeatedly implement the following processing.

1.9. Modification Examples (Propagation of Near-Infrared Light)

Next, modification examples in accordance with the present embodiment will be described. In the aforementioned explanations, such a case that the jacket 30 in accordance with the present embodiment is provided with the output unit 310, the sensor unit 320, the controller 330 and the server communication unit 340 has been described as an example. On the other hand, in addition to the above, the jacket 30 in accordance with the present embodiment may be further provided with, e.g., an illuminator 350 that radiates near-infrared light. The jacket 30, in accordance with the present embodiment, provided with such the illuminator 350 as mentioned above enables the near-infrared light radiated from the illumination device 20 to propagate to the other jacket 30.

Figure 10:
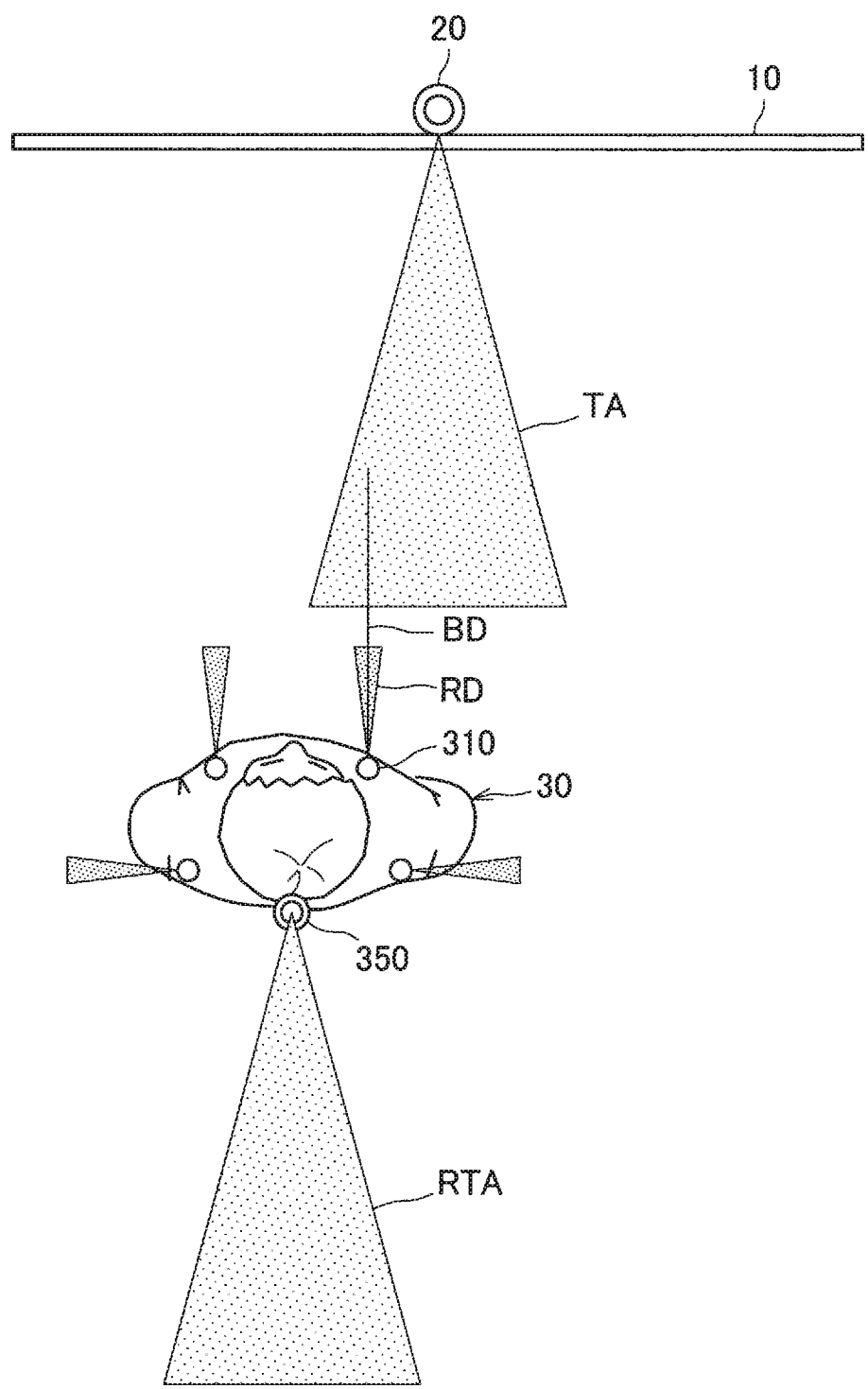
FIG. 10 is a schematic diagram for explaining a propagation of near-infrared light in accordance with the same embodiment.

FIG. 10 is a schematic diagram for explaining the propagation of the near-infrared light in accordance with the present embodiment. FIG. 10 illustrates the positional relationship between the display device 10, the illumination device 20 and the jacket 30, in a manner overviewing from the upper direction.

Further, as aforementioned, the jacket 30 illustrated in FIG. 10 may be provided with the illuminator 350. Referring to FIG. 10, the illuminator 350 in accordance with the present embodiment radiates the near-infrared light from the back face portion of the jacket 30. In this connection, in FIG. 10, an irradiation range RTA of the near-infrared light to be radiated by the illuminator 350 is depicted.

On this occasion, on the basis of the reference direction and the relative direction, acquired on the basis of the near-infrared light radiated from the illumination device 20, the controller 330 in accordance with the present embodiment can control the irradiation direction of the near-infrared light emitted by the illuminator 350. The above-mentioned control conducted by the controller 330 in accordance with the present embodiment enables the near-infrared light radiated from the illumination device 20 to propagate to the other jacket 30 located backward, for instance. On this occasion, the illuminator 350 may be realized by such a device that has a directivity towards the irradiation direction of the near-infrared light, or, as well as the output units 310 and the sensor units 320, a plurality of illuminators 350 may be disposed around the periphery of the jacket 30.

According to the illuminator 350 and the controller 330, in accordance with the present embodiment, even in a case such that due to a fact that there resides a large number of users, arisen is a fear that the near-infrared light radiated from the illumination device 20 would be shut off by any one of the other users, the above-mentioned operation for making the near-infrared light propagate enables the system to be operated stably.

(Output Control Based on Action Information)

Next, an output control based on action information in accordance with the present embodiment will be described. The aforementioned description has been made in regard to the case such that the controller 330 conducts the output controls based on the positional information. On the other hand, the controller 330 in accordance with the present embodiment may conduct the output control on the basis of the action information of the user.

Figure 11:
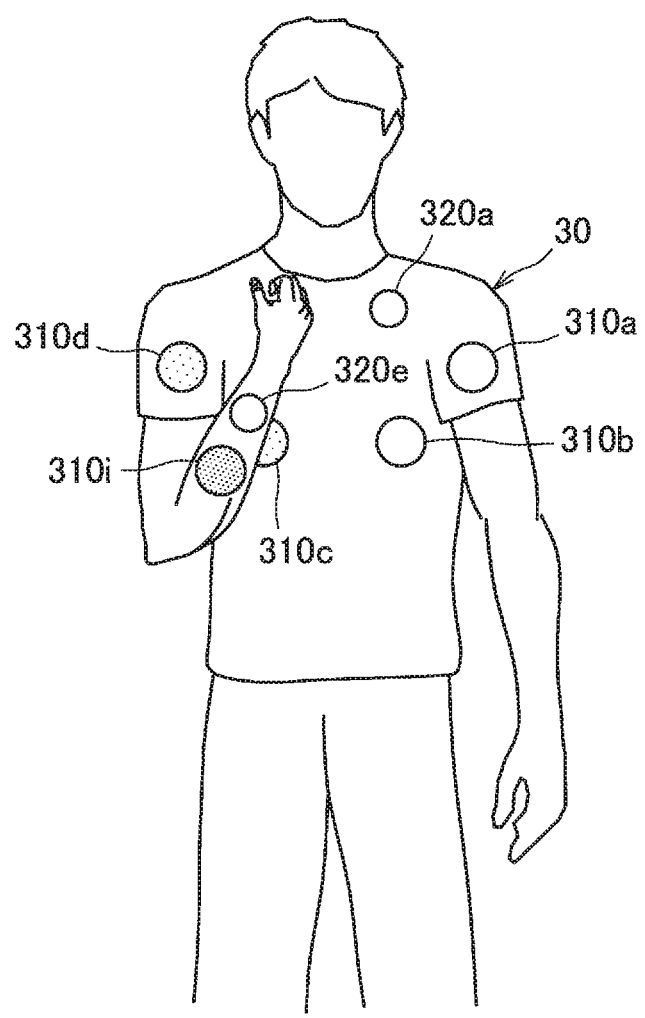
FIG. 11 is a schematic diagram for explaining an output control based on action information in accordance with the same embodiment.

FIG. 11 is a schematic diagram for explaining the output control based on the action information in accordance with the present embodiment. In FIG. 11, an example of the output control in an occasion when the user wearing the jacket 30 performs an action for protecting his body with his forearm is depicted. On this occasion, the controller 330 in accordance with the present embodiment can correct the output unit 310 serving as the control object and/or the output strength on the basis of the forearm action detected by the sensor unit 320.

Referring to FIG. 11, in addition to the configuration illustrated in FIG. 4, the jacket 30 is provided with an output unit 310i and a sensor unit 320e. On this occasion, on the basis of the action information detected by the sensor unit 320e, the controller 330 may conduct the output control in such a manner that the tactile stimulus and/or the acoustic information to be outputted to the output units 310c and 310d are made to be outputted to the output unit 310i. In addition, as illustrated in FIG. 11, the controller 330 may disperse the output strength of the tactile stimulus and/or that of the acoustic information between the output units 310c, 310d, and 310i. On this occasion, the controller 330 may control so as to make the output strength of the output unit 310i larger than those of output units 310c and 310d.

For instance, in a case where the user performs an action for protecting himself with his forearm against an attack from the virtual object VO displayed on the display device 10, or the like, the above-mentioned control conducted by the controller 330 in accordance with the present embodiment makes it possible to represent the user the tactile stimulus and/or the acoustic information having a more realistic sense.

In this connection, the forearm action to be performed by the user as mentioned above can be detected by, e.g., an accelerometer, a gyrosensor or the like provided in the sensor unit 320e. Further, according to the above-mentioned sensor, by detecting a shape change of the jacket 30, it is expected to conduct the output control corresponding to the shape change concerned. Further, in case that the sensor unit 320 detects a horizontal movement, the controller 330 determines that the user has dodged over the attack, and may halt the output of the tactile stimulus and/or the acoustic information. Still further, on the basis of various kinds of information detected by the sensor unit 320, it is also possible for the controller 330 to forecast a status of the jacket 30 in a future to conduct the output control.

Other Modification Examples

In the aforementioned explanations, an example where the detection of the positional information in accordance with the present embodiment is realized by employing the near-infrared light sensor and the gyrosensor provided in the sensor unit 320 has been described. On the other hand, the detection of the positional information in accordance with the present embodiment may be realized by employing a sensor(s) different from the above-cited sensors.

For example, the detection of the positional information in accordance with the present embodiment may be realized by employing an imaging device provided in the sensor unit 320. In this case, the controller 330 may detects the directional information by parsing an image captured by the sensor unit 320. Alternatively, it is also possible for the controller 330 to detect the directional information on the basis of the fact that the sensor unit 320 recognizes pattern information projected by the illumination device 20. Further, for example, the detection of the positional information in accordance with the present embodiment may be realized by employing a geomagnetic sensor and/or a microphone array provided in the sensor unit 320.

Further, in the aforementioned explanations, an example where the controller 330 conducts the output control on the basis of the relative direction relative to the static object, such as the illumination device 20 or the like, has been described. On the other hand, it is also possible for the controller 330 in accordance with the present embodiment to calculate the relative direction relative to a dynamic object to conduct the output control thereby. Herein, the above-mentioned dynamic object may include, e.g., a rifle-shaped illuminator possessed by another user. In this case, the controller 330 can conduct the output control on the basis of the fact that the sensor unit 320 receives the near-infrared light radiated from the rifle-shaped illuminator. According to the above-mentioned function provided in the controller 330, the output control can be conducted even in a case such that, e.g., the user wearing the jacket 30 moves around within the room, is riding on a vehicle, or the like.

Still further, the controller 330 in accordance with the present embodiment may conduct the output control based on the state of the output unit 310. The controller 330 acquires information in regard to, e.g., a failure and/or a malfunction from the output unit 310, and may conduct the control based on the information concerned. For instance, in case that the controller 330 acquires information in regard to a failure and/or a malfunction from the output unit 310, the controller 330 can make the other output unit 310, being adjacent to the output unit 310 concerned, serve as a proxy for outputting the tactile stimulus and the acoustic information.

Yet further, in the aforementioned explanations, an example where the controller 330 corrects the control object and/or the output strength on the basis of the positional information has been described. However, in addition to the above, the controller 330 may also control a kind of the tactile stimulus or the like. On this occasion, the controller 330 may change the kind of the tactile stimulus on the basis of the positional information, or, on the basis of the angular velocity information or the like acquired by the sensor unit 320.

2. HARDWARE CONFIGURATION EXAMPLE

Figure 12:
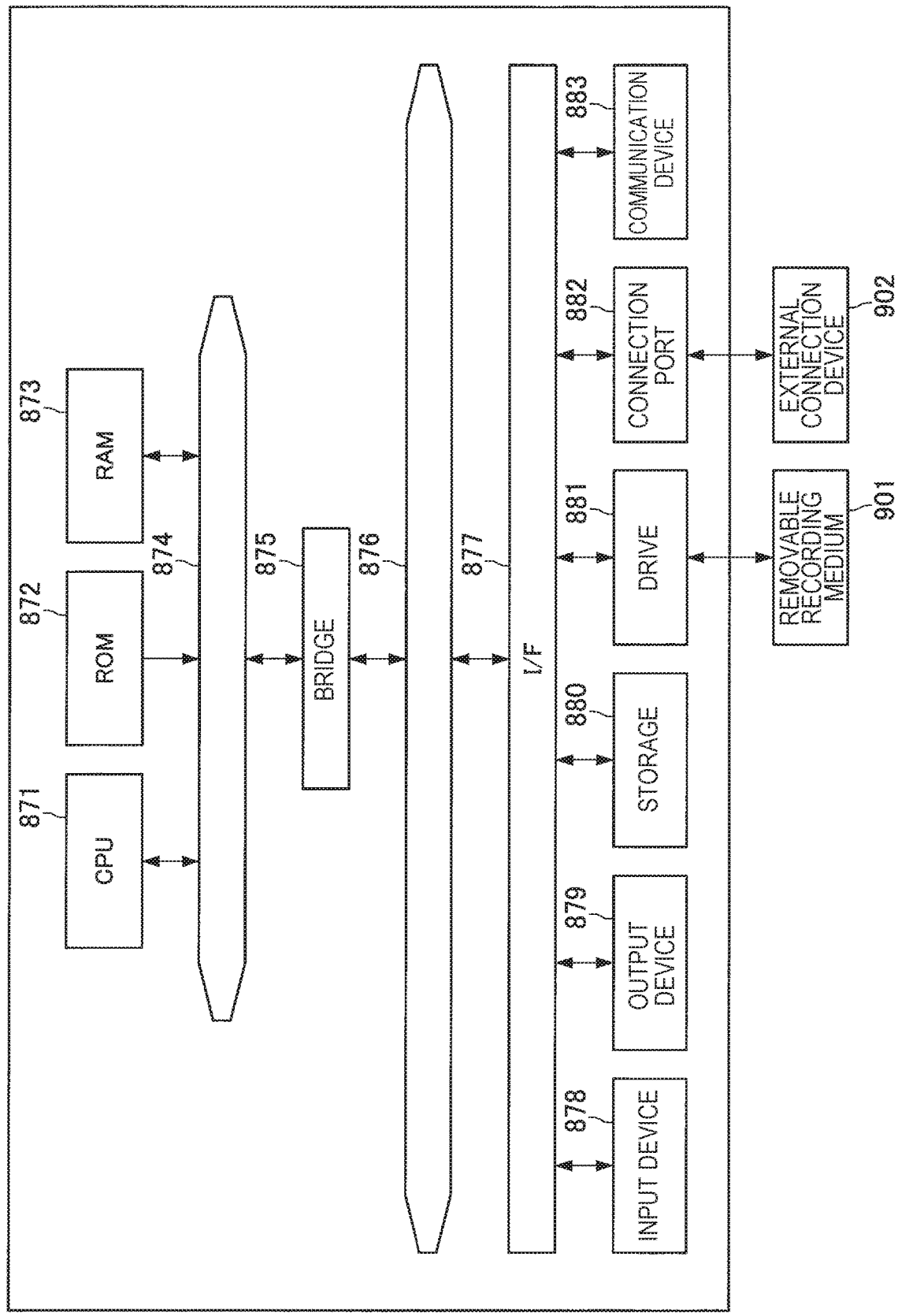
FIG. 12 is a hardware configuration example of an information processing server in accordance with the same embodiment.

Next, a hardware configuration example of the information processing server 40 according to the present disclosure will be described. FIG. 12 is a block diagram illustrating the hardware configuration example of the information processing server 40 according to the present disclosure. With reference to FIG. 12, for example, the information processing server 40 according to the present disclosure includes a CPU 871, ROM 872, RAM 873, a host bus 874, a bridge 875, an external bus 876, an interface 877, an input device 878, an output device 879, a storage 880, a drive 881, a connection port 882, and a communication device 883. Note that, the hardware configuration illustrated here is an example. Some of the structural elements may be omitted. In addition, a structural element other than the structural elements illustrated here may be further added.

(CPU 871)

The CPU 871 functions as an arithmetic processing device or a control device, for example, and controls entire operation or a part of the operation of each structural element on the basis of various programs recorded on the ROM 872, the RAM 873, the storage 880, or a removable recording medium 901.

(ROM 872 and RAM 873)

The ROM 872 is a mechanism for storing a program to be loaded on the CPU 871, data used in an arithmetic operation, or the like. The RAM 873 temporarily or permanently stores, for example, a program to be loaded on the CPU 871, various parameters that arbitrarily changes in execution of the program, or the like.

(Host Bus 874, Bridge 875, External Bus 876, and Interface 877)

The CPU 871, the ROM 872, and the RAM 873 are interconnected with each other, for example, via the host bus 874 capable of high-speed data transmission. On the other hand, the host bus 874 is connected, for example, via the bridge 875, to the external bus 876 having comparatively low data transmission speed. In addition, the external bus 876 is connected with various structural elements via the interface 877.

(Input Device 878)

For example, as the input device 878, a mouse, a keyboard, a touchscreen, a button, a switch, a lever, or the like is used. In addition, as the input device 878, a remote controller (hereinafter, referred to as a remote) capable of transmitting a control signal by using infrared or other radio waves may be used.

(Output Device 879)

The output device 879 is, for example, a display device such as a cathode ray tube (CRT), an LCD, or an organic EL, an audio output device such as a speaker or headphones, or a device that can visually or audibly notify a user of acquired information such as a printer, a mobile phone, or a facsimile.

(Storage 880)

The storage 880 is a device for storing various kinds of data. As the storage 880, for example, a magnetic storage device such as a hard disk drive (HDD), a semiconductor storage device, an optical storage device, a magneto-optical storage device, or the like is used.

(Drive 881)

The drive 881 is a device for reading information recorded on the removable recording medium 901 and writing information on the removable recording medium 901. The removable recording medium 901 is, for example, a magnetic disk, an optical disk, a magneto-optical disk, a semiconductor memory, or the like.

(Removable Recording Medium 901)

The removable recording medium 901 is, for example, a DVD medium, a Blu-ray (registered trademark) medium, an HD-DVD medium, various types of semiconductor storage media, or the like. Of course, the removable recording medium 901 may be, for example, an electronic device, an IC card on which a non-contact IC chip is mounted, or the like.

(Connection Port 882)

The connection port 882 is, for example, a port for connecting an external connection device 902 such as a Universal Serial Bus (USB) port, an IEEE934 port, a Small Computer System Interface (SCSI), an RS-232C port, or an optical audio terminal.

(External Connection Device 902)

The external connection device 902 is, for example, a printer, a portable music player, a digital camera, a digital video camera, an IC recorder, or the like.

(Communication Device 883)

The communication device 883 is a communication device used for a connection to a network. The communication device 883 may be, for example, a communication card for a wired or wireless LAN, Bluetooth (registered trademark) or a wireless USB (WUSB), a rooter for optical communication, a rooter for an asymmetric digital subscriber line (ADSL), or a modem for various kinds of communication.

3. CONCLUSION

As described in the foregoing, the jacket 30 in accordance with the present embodiment establishes the reference direction on the basis of the near-infrared light received thereby, and, on the basis of the reference direction concerned and the angular velocity information detected, the jacket 30 can calculate the relative direction relative to the object. In addition, the jacket 30 in accordance with the present embodiment generates the control signal derived by correcting the common signal on the basis of the relative information calculated, and can conduct the output control on the basis of the information concerned. According to such the configuration, it becomes possible for the device to realize the control of the output position more efficiently.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For instance, although an example where the jacket 30 conducts the output control based on the positional information has been described in the aforementioned embodiment, the present technology is not limited to such the example as aforementioned. For instance, the information processing server 40 may conduct the output control for the jacket 30 on the basis of the positional information acquired from the jacket 30 by the information processing server 40. In this case, the generating unit 420 of the information processing server 40 acquires the reference direction and the relative direction on the basis of the sensor information of the jacket 30, acquired through the communication unit 430, and can transmit the control signal, corrected on the basis of the information concerned, to the jacket 30.

Further, the respective steps in the processing of the jacket 30 in this specification are not necessarily executed in chronological order in accordance with the order illustrated in the flowcharts. In one example, the respective steps in the processing of the jacket 30 can be processed in the order different from the order illustrated in the flowcharts, or can also be processed in parallel.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An output control device including:

a controller that, on the basis of a common signal to be employed by a plurality of devices, conducts an output control in regard to a plurality of output units provided in the device, in which the common signal includes information specifying an output unit serving as a control object, and the controller generates a control signal derived by correcting the output unit serving as the control object on the basis of positional information of the device and the common signal which are acquired, and conducts the output control specific to the device on the basis of the control signal.

(2)

The output control device according to (1), in which the common signal includes information designating an output strength, and the controller generates the control signal derived by correcting the output strength on the basis of the positional information and the common signal.

(3)

The output control device according to (1) or (2), in which the positional information includes directional information, and the controller generates the control signal on the basis of the directional information and the common signal.

(4)

The output control device according to (3), in which the directional information includes a relative direction relative to an object, and the controller generates the control signal on the basis of the relative direction and the common signal.

(5)

The output control device according to (4).

in which the controller calculates the relative direction on the basis of a reference direction acquired from the object.

(6)

The output control device according to (5), in which the controller establishes the relative direction on the basis of near-infrared light radiated from the object, and calculates the relative direction on the basis of the reference direction and acquired angular velocity information.

(7)

The output control device according to any of (1) to (6), further including:

a plurality of the output units.

(8)

The output control device according to any of (1) to (7), further including:

a sensor unit that acquires the positional information.

(9)

The output control device according to any of (1) to (8), further including:

a communication unit that receives the common signal.

(10)

The output control device according to any of (1) to (9), in which the output unit represent a tactile stimulus on the basis of a control by the controller.

(11)

The output control device according to any of (1) to (10), in which, further on the basis of acquired action information, the controller generates the control signal.

(12)

The output control device according to (6), further including:

an illuminator that radiates near-infrared light, in which, on the basis of the reference direction and the relative direction, the controller makes the illuminator radiate near-infrared light.

(13)

An output controlling method including:

conducting, on the basis of a common signal to be employed by a plurality of devices, an output control in regard to a plurality of output units provided in the device, by a processor, in which the common signal includes information specifying an output unit serving as a control object, and the conducting the output control further includes generating a control signal derived by correcting the output unit serving as the control object on the basis of positional information of the device and the common signal which are acquired, and conducting the output control specific to the device on the basis of the control signal.

(14)

A program for causing a computer to function as an output control device, the output control device including a controller that, on the basis of a common signal to be employed by a plurality of devices, conducts an output control in regard to a plurality of output units provided in the device, in which the common signal includes information specifying an output unit serving as a control object, and the controller generates a control signal derived by correcting the output unit serving as the control object on the basis of positional information of the device and the common signal which are acquired, and conducts the output control specific to the device concerned on the basis of the control signal.

REFERENCE SIGNS LIST 10 display device
20 illumination device
30 jacket
310 output unit
320 sensor unit
330 controller
340 server communication unit
350 illuminator
40 information processing server
410 display controller
420 generating unit
430 communication unit

The invention claimed is:

1. An output control device comprising:

a controller that, on a basis of a common signal to be employed by a plurality of output control devices, conducts an output control in regard to a plurality of output units provided in the output control device, wherein the common signal includes information specifying an output unit serving as a control object, and the controller generates a control signal derived by correcting the output unit serving as the control object on a basis of positional information of the device and the common signal which are acquired, and conducts the output control specific to the device on a basis of the control signal, and the controller is implemented via at least one processor.

2. The output control device according to claim 1, wherein the common signal includes information designating an output strength, and the controller generates the control signal derived by correcting the output strength on the basis of the positional information and the common signal.

3. The output control device according to claim 1, wherein the positional information includes directional information, and the controller generates the control signal on a basis of the directional information and the common signal.

4. The output control device according to claim 3, wherein the directional information includes a relative direction relative to an object, and the controller generates the control signal on a basis of the relative direction and the common signal.

5. The output control device according to claim 4, wherein the controller calculates the relative direction on a basis of a reference direction acquired from the object.

6. The output control device according to claim 5, wherein the controller establishes the relative direction on a basis of near-infrared light radiated from the object, and calculates the relative direction on a basis of the reference direction and acquired angular velocity information.

7. The output control device according to claim 1, further comprising:

a plurality of the output units.

8. The output control device according to claim 1, further comprising:

a sensor unit that acquires the positional information, wherein the sensor unit is implemented via at least one processor.

9. The output control device according to claim 1, further comprising:

a communication unit that receives the common signal, wherein the communication unit is implemented via at least one processor.

10. The output control device according to claim 1, wherein the output unit represents a tactile stimulus on a basis of a control by the controller.

11. The output control device according to claim 1, wherein, further on a basis of acquired action information, the controller generates the control signal.

12. The output control device according to claim 6, further comprising:

an illuminator that radiates near-infrared light, wherein, on a basis of the reference direction and the relative direction, the controller makes the illuminator radiate near-infrared light.

13. An output controlling method comprising:
conducting, on a basis of a common signal to be employed by a plurality of output control devices, an output control in regard to a plurality of output units provided in one of the plurality of output control devices, by a processor,
wherein the common signal includes information specifying an output unit serving as a control object, and
the conducting the output control further includes generating a control signal derived by correcting the output unit serving as the control object on a basis of positional information of the device and the common signal which are acquired, and conducting the output control specific to the device on a basis of the control signal.

14. A non-transitory computer-readable medium having embodied thereon a program, which when executed by a computer causes the computer to execute a method, the method comprising:
conducting, on a basis of a common signal to be employed by a plurality of output control devices, an output control in regard to a plurality of output units provided in one of the plurality of output control devices,
wherein the common signal includes information specifying an output unit serving as a control object, and
the conducting the output control further includes generating a control signal derived by correcting the output unit serving as the control object on a basis of positional information of the device and the common signal which are acquired,
and conducting the output control specific to the device concerned on a basis of the control signal.

* * * * *